United States Patent [19]
Chikuma et al.

[11] Patent Number: 5,512,383
[45] Date of Patent: Apr. 30, 1996

[54] WAVEWENGTH CONVERTING ELEMENT AND METHOD OF MANUFACTURING THE SAME

[75] Inventors: Kiyofumi Chikuma; Atsushi Onoe, both of Tsurugashima, Japan

[73] Assignee: Pioneer Electronic Corporation, Tokyo, Japan

[21] Appl. No.: 266,629

[22] Filed: Jun. 28, 1994

[30] Foreign Application Priority Data

Jun. 28, 1993 [JP] Japan ..................... 5-157411

[51] Int. Cl.$^6$ .................. B32B 9/00; G02B 6/00
[52] U.S. Cl. .............. 428/689; 428/699; 428/701; 428/702; 385/130; 385/131
[58] Field of Search .................. 359/332, 328; 385/122, 130, 131, 129, 132; 428/210, 689, 699, 700, 701, 702, 409; 427/163.2, 523, 526, 529; 430/11, 14

[56] References Cited

U.S. PATENT DOCUMENTS

| | | | |
|---|---|---|---|
| 4,840,816 | 6/1989 | Appleton | 427/38 |
| 4,953,931 | 9/1990 | Miyazaki | 350/96.12 |
| 4,953,943 | 9/1990 | Miyazaki | 350/96.12 |
| 5,199,097 | 3/1993 | Shinokwa | 385/122 |
| 5,227,011 | 7/1993 | Enomoto | 156/643 |
| 5,357,533 | 10/1994 | Mizuuchi | 372/22 |
| 5,373,579 | 12/1994 | Eda | 385/131 |

*Primary Examiner*—Ellis P. Robinson
*Assistant Examiner*—Leonidas J. Jones, III
*Attorney, Agent, or Firm*—Sughrue, Mion, Zinn, Macpeak & Seas

[57] ABSTRACT

A method of manufacturing a wavelength converting element forms an optical waveguide having a substantially uniform thickness and a desired size. A thin film of lithium niobate is formed on a substrate of lithium tantalate, and a mask corresponding to an optical waveguide is formed on the thin film. A proton exchange is performed on a predetermined area of the thin film through the mask. A potassium ion exchange is further performed on the proton-exchanged area, thus yielding the optical waveguide. The mode of light that propagates in the optical waveguide can be set to a low-order mode, so that the efficiency of converting the incident light to the second harmonic is improved.

2 Claims, 4 Drawing Sheets

1

WAVEWENGTH CONVERTING ELEMENT AND METHOD OF MANUFACTURING THE SAME

BACKGROUND OF THE INVENTION

1. Field of the Invention

The present invention relates to a wavelength converting element for generating the second harmonic of incident light, and a method of manufacturing the same.

2. Description of Background Information

In general, a wavelength converting element for generating the second harmonic of incident light, or an SHG (Second Harmonic Generation) element, is designed such that an optical waveguide, which outputs the second harmonic excited by an incident laser beam, is formed in a substrate of a non-linear optical crystal.

Most of SHG elements are prepared by the following method. As shown in FIG. 1, for example, a tantalum (Ta) mask 3 having an opening 2 equivalent to an optical waveguide is formed on a −z face of a lithium niobate ($LiNbO_3$) crystal which becomes a substrate 1. Then, a proton exchange is performed on a partial area 4 of the $LiNbO_3$ substrate 1 through the opening 2 as shown in FIG. 2. This proton exchange is conducted at 220° C. for eight hours using a phosphoric acid solution, for example. Next, a potassium ($K^+$) ion exchange is performed in the area 4 of $LiNbO_3$ which has undergone the proton exchange, forming an optical waveguide 5 of potassium niobate ($KNbO_3$) on the $LiNbO_3$ substrate 1 as shown in FIG. 3. The potassium ion exchange is conducted at 400° C. for eight hours using a potassium nitrate ($KNO_3$) solution, for example.

If the optical waveguide 5 of $KNbO_3$ is formed in the $LiNbO_3$ substrate 1 by the above method, however, the diffusion of the $K^+$ ions is deep and the shape of the cross section of the optical waveguide 5 is not fixed. Naturally, the mode of light which propagates in the optical waveguide 5 thus formed becomes a multi-order mode. The SHG element using this optical waveguide 5 cannot therefore yield a high converting efficiency.

SUMMARY OF THE INVENTION

It is therefore an object of the present invention to provide a wavelength converting element whose optical waveguide can be formed to have a desired cross-sectional shape and which has a high efficiency of converting incident light, and a method of manufacturing the wavelength converting element.

To achieve the above object, according to one aspect of this invention, there is provided a method of manufacturing a wavelength converting element for generating a second harmonic of light incident to an optical waveguide, comprising the steps of forming a mask corresponding to the optical waveguide on a thin film of lithium niobate, formed on a substrate of lithium tantalate and having a predetermined thickness; performing a proton exchange on a predetermined area of the thin film through the mask; and performing a potassium ion exchange on the area having undergone the proton exchange.

According to another aspect of this invention, there is provided a method of manufacturing a wavelength converting element for generating a second harmonic of light incident to an optical waveguide, comprising the steps of forming a thin film of lithium niobate having a predetermined thickness on a substrate of lithium tantalate and performing a proton exchange on the thin film; forming a mask on the thin film for covering an area to be the optical waveguide; etching out a portion of the thin film, which is not covered with the mask, after the mask forming step; and removing the mask after the etching step and performing a potassium ion exchange on a remaining portion of the thin film.

According to the methods of manufacturing wavelength converting element, which embody the present invention, the depth of the area to be subjected to a proton exchange can be made equal to the thickness of the $LiNbO_3$ thin film almost evenly, and the optical waveguide is formed by further performing a potassium ($K^+$) ion exchange on the proton-exchanged area, so that the depth of the optical waveguide from the substrate surface can be controlled.

As the optical waveguide of the wavelength converting element embodying this invention has a shallow depth, the mode of light that propagates in the optical waveguide can be set to a low-order mode.

DETAILED DESCRIPTION OF THE PREFERRED EMBODIMENTS

An SHG element according to a first embodiment of the present invention will be described below with reference to FIGS. 4 through 7.

Figure 1:
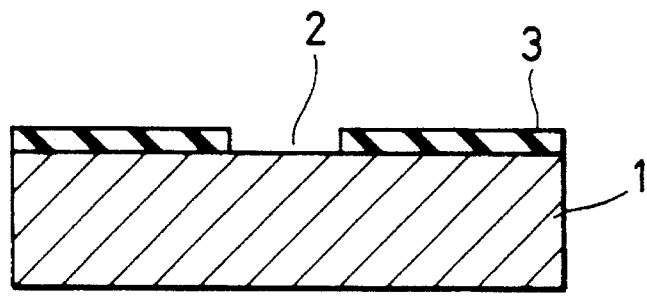
FIGS. 1, 2 and 3 are diagrams for explaining steps of forming an optical waveguide of a conventional SHG element.
Figure 2:
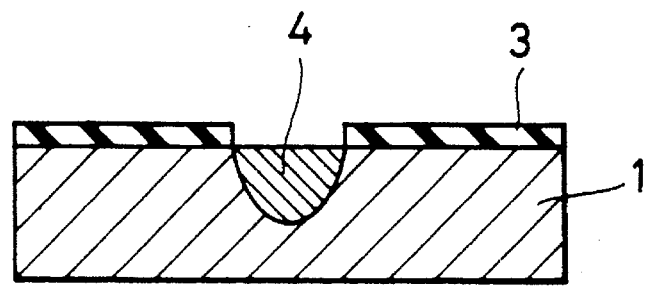
Figure 3:
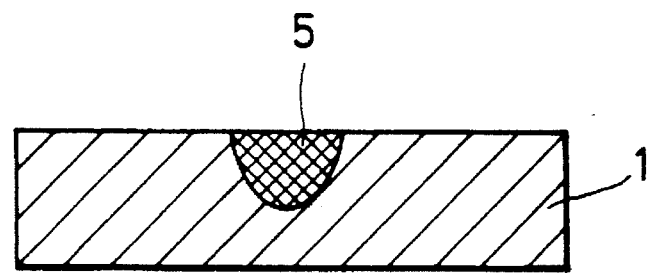
Figure 4:
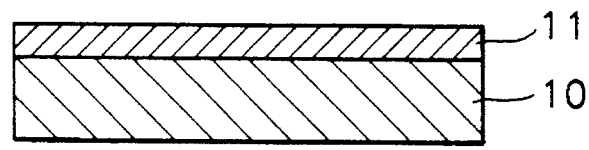
FIGS. 4, 5, 6 and 7 are diagrams for explaining steps of forming an optical waveguide of an SHG element according to a first embodiment of the present invention.

In FIG. 4, a $LiNbO_3$ thin film 11 is formed on a LiTaO3 substrate 10 prepared by cutting the +z face of a $LiTaO_3$ crystal as a major surface. This $LiNbO_3$ thin film 11 is formed by a liquid phase epitaxial (LPE) method, for example. In the LPE method, $Li_2O$—$V_2O_5$ is used as an LPE growing flux, and the raw materials are weighed and mixed in such a way that the melt composition becomes $LiNbO_3$: $Li_{0.7}Na_{0.3}VO_3$=20: 80 (mol %), and the mixture, placed in a platinum crucible, is set in a furnace. The mixture is melted at 1000° to 1100° C. to have an even composition, and is then over-cooled to or below a saturating temperature. Next, the $LiTaO_3$ substrate 10, attached to a platinum substrate holder with the +z face of the $LiTaO_3$ substrate 10 facing downward, is inserted in the furnace and is sufficiently preheated on the flux. The resultant structure is then isothermally grown by the horizontal one-side dipping system. For example, the growing temperature is 930° to 950° C., the number of rotations of the substrate at the time of growth is 10 to 100 rpm, and the growing speed is about 1.0 μm/min. The $LiNbO_3$ thin film 11 is formed by this LPE method.

The $LiNbO_3$ thin film 11 may be formed by a vapor phase epitaxial method instead of the LPE method.

Figure 5:
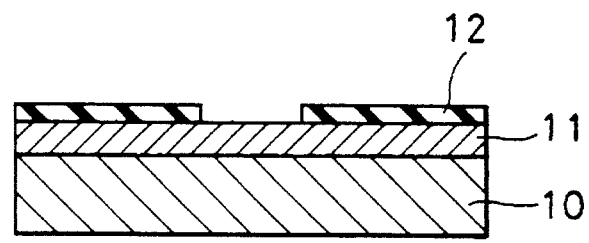

Next, a Ta thin film 12 which is to be a mask is evenly vapor deposited at a thickness of 300 angstroms on the $LiNbO_3$ thin film 11 by, for example, electron beam deposition, as shown in FIG. 5. A resist is coated on this Ta thin film, and a mask pattern corresponding to an optical waveguide is transferred on the resist film. The pattern of the optical waveguide is then transferred onto the Ta thin film through a step like RIE (Reactive Ion Etching), thus yielding a Ta mask 12.

Figure 6:
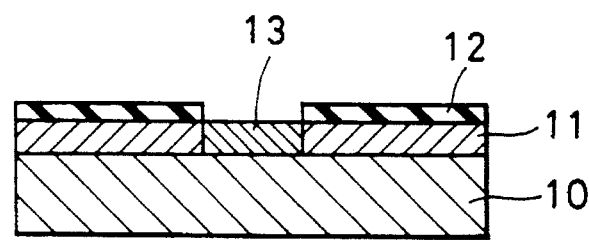

Then, a proton exchange is performed on the LiNbO$_3$ thin film 11 via the Ta mask 12 as shown in FIG. 6. This proton exchange is conducted at 260° C. for one hour using, for example, pyrophosphoric acid (H$_4$P$_2$O$_7$). The proton exchange is effected to remove the Li$^+$ ions from an area 13 in the LiNbO$_3$ thin film 11 shown in FIG. 6. The temperature, time and the density of pyrophosphoric acid for the proton exchange are controlled in such a manner that the depth of the area 13 becomes approximately the thickness of the LiNbO$_3$ thin film 11.

Figure 7:
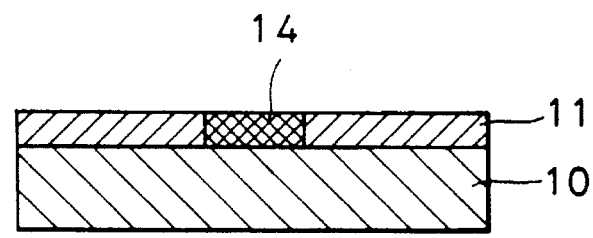

Next, a K$^+$ ion exchange is further conducted on the area 13 which has undergone the proton exchange. This K$^+$ ion exchange is carried out at 400° C. for two hours using, for example, a potassium nitrate (KNO$_3$) solution. This K$^+$ ion exchange substitutes the protons of the area 13 with K$^+$ ions, forming an optical waveguide 14 of potassium niobate (KNbO$_3$) on the substrate 10 as shown in FIG. 7.

The SHG element prepared in this manner has the LiNbO$_3$ thin film 11 on the LiTaO$_3$ substrate 10 and the optical waveguide 14 of KNbO$_3$, which is formed in the LiNbO$_3$ thin film 11 and has a nearly rectangular cross-sectional shape with its depth equal to the thickness of the LiNbO$_3$ thin film 11.

The function and advantages of this embodiment will be explained below.

Figure 8:
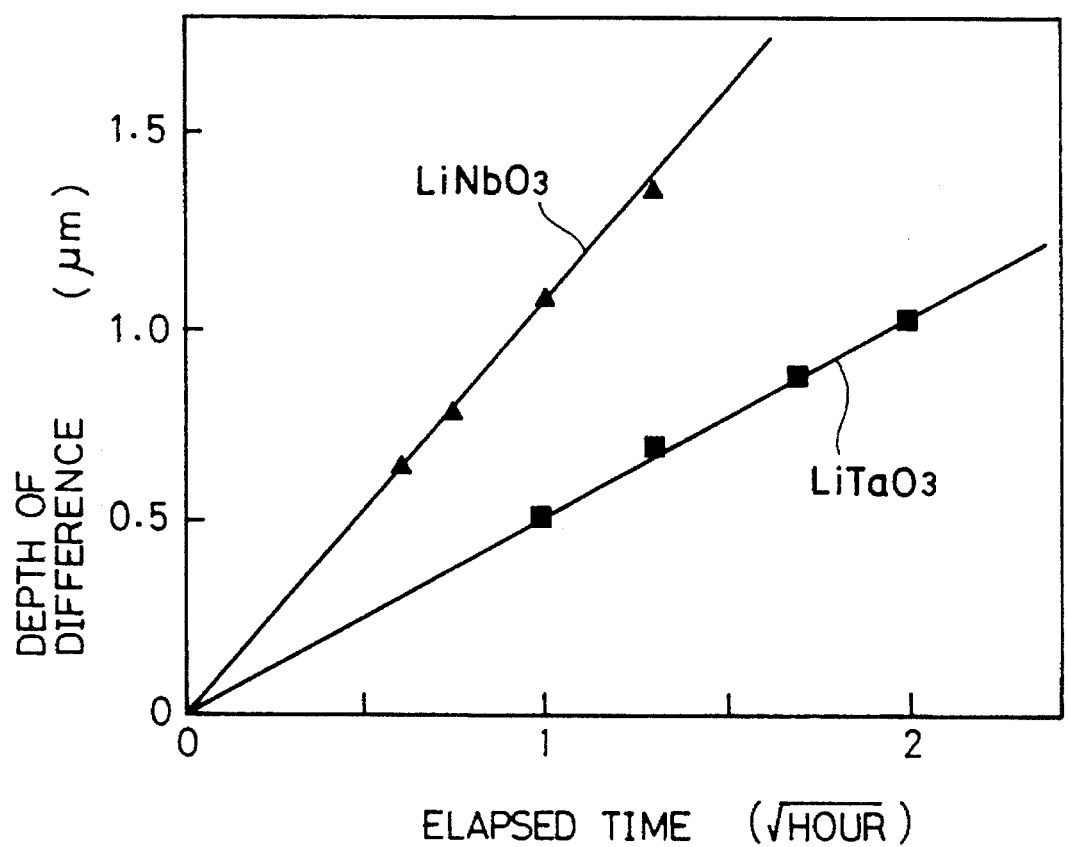
FIG. 8 is a graph showing proton exchange rates for a $LiTaO_3$ crystal and $LiNbO_3$ crystal.

At the time of conducting the proton exchange on the LiNbO$_3$ thin film 11 on the LiTaO$_3$ substrate 10 in the fabrication of the SHG element, the exchange rate for LiTaO$_3$ is smaller than that for LiNbO$_3$ as shown in FIG. 8, so that the proton exchange on the LiNbO$_3$ thin film side progresses in parallel to the interface between the LiNbO$_3$ thin film 11 and the LiTaO$_3$ substrate 10 at a quicker rate than the proton exchange progresses in the thickness direction on the LiTaO$_3$ substrate side. By properly adjusting the density of pyrophosphoric acid, the temperature and the time for the proton exchange, the thickness or depth of the area 13 which is to be a proton exchange layer can evenly be set to the thickness of the LiNbO$_3$ thin film 11. Further, the area 13 as the proton exchange layer can have a substantially rectangular cross section.

With regard to the K$^+$ ion exchange, the ion exchange rate for proton-exchanged LiTaO$_3$ is smaller than that for proton-exchanged LiNbO$_3$, so that the thickness of the area to be a K$^+$ ion exchange layer can be set to the thickness of the LiNbO$_3$ thin film 11.

Generally, it is considered difficult to directly exchange Li$^+$ ions of the LiNbO$_3$ crystal or LiTaO$_3$ crystal with K$^+$ ions. Therefore, the optical waveguide 14 is not formed outside the proton-exchanged area 13 in the LiNbO$_3$ thin film 11. The desired optical waveguide 14 can be formed in the substrate by specifically setting the depth and shape of the area 13 which becomes the optical waveguide 14.

It is therefore possible to control the thickness of the KNbO$_3$ layer which becomes the optical waveguide 14 by changing the thickness of the LiNbO$_3$ thin film 11. The optical waveguide 14 can be formed to have a predetermined shape, a substantially rectangular shape in this embodiment.

As the optical waveguide 14 of the above-described SHG element can have a desired shape and the K$^+$ ion is diffused at a shallow depth in the optical waveguide 14, the mode of light that propagates in the optical waveguide 14 can be set to a low-order mode, ensuring an improved efficiency of converting the second harmonic of incident light.

An SHG element according to a second embodiment of the present invention will now be described with reference to FIGS. 9 through 11.

Figure 9:
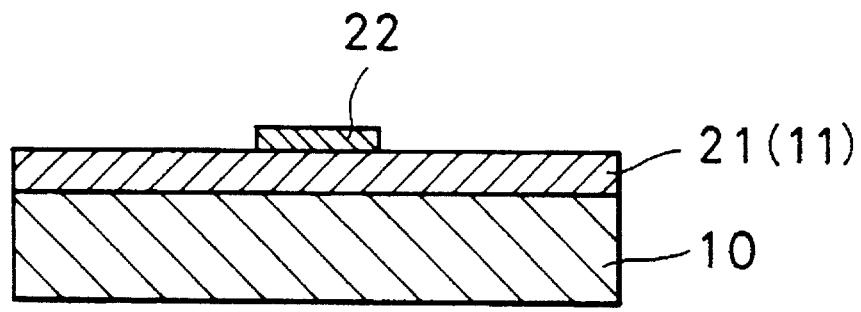
FIGS. 9, 10 and 11 are diagrams for explaining steps of forming an optical waveguide of an SHG element according to a second embodiment of the present invention.

In FIG. 9, as in FIG. 4, a LiNbO$_3$ thin film 11 is formed on a LiTaO$_3$ substrate 10 prepared by cutting the +z face of a LiTaO$_3$ crystal as a major surface. Then, a proton exchange is performed on the LiNbO$_3$ thin film 11 to remove the Li$^+$ ions from the LiNbO$_3$ thin film 11, forming a proton exchange LiNbO$_3$ film 21. The proton exchange is conducted by adjusting the conditions, such as the density of pyrophosphoric acid, the temperature and the time for the proton exchange, with the proton exchange for the LiTaO$_3$ substrate 10 suppressed as low as possible.

Next, a thin film or resist of metal, such as Ta, is deposited on the proton-exchanged LiNbO$_3$ film 21 to form a mask 22 that covers the area in the proton-exchanged LiNbO$_3$ film 21 which corresponds to an optical waveguide. With the mask being a thin metal film, for example, the mask is formed by a thin metal film forming method, like an electron beam vapor deposition, and the conventional patterning as in the first embodiment.

Figure 10:
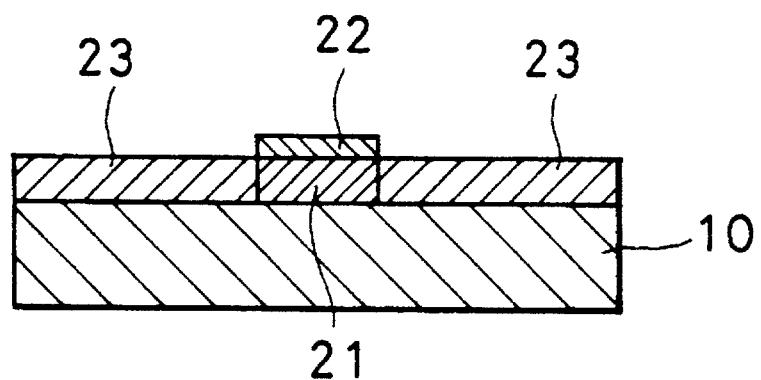
Figure 11:
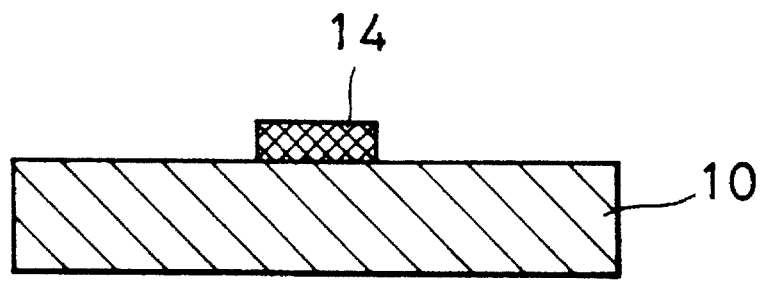

Then, a proton-exchanged LiNbO3 film 23 which is not covered with the mask 22, i.e., a portion of the proton-exchanged LiNbO$_3$ film 23 other than the area which becomes an optical waveguide, is removed by dry etching using gas, such as C$_2$F$_6$ as shown in FIG. 10. After the portion of the proton-exchanged LiNbO$_3$ film 23 other than the area which becomes an optical waveguide is removed, the mask 22 is removed.

Next, a K$^+$ ion exchange is conducted on the proton-exchanged LiNbO$_3$ film 21 which is to be the optical waveguide. This K$^+$ ion exchange is carried out under the same conditions as given in the first embodiment. This K$^+$ ion exchange substitutes the protons of the proton-exchanged LiNbO$_3$ film 21 with K$^+$ ions, forming an optical waveguide 14 of potassium niobate (KNbO$_3$) on the substrate 10 as shown in FIG. 11. Since it is considered difficult to directly exchange Li$^+$ ions of the LiTaO$_3$ crystal with K$^{+0}$ ions, no K$^+$ ion exchange is performed on the LiTaO$_3$substrate 10. Therefore, the optical waveguide 14 formed in the above-described method can have a substantially rectangular shape and can have a depth substantially the same as the thickness of the LiNbO$_3$ thin film 11.

Therefore, the thickness of the KNbO$_3$ layer which becomes the optical waveguide 14 of the SHG element according to the second embodiment can be controlled by changing the thickness of the LiNbO$_3$ thin film 11, and the optical waveguide 14 can be formed to have a predetermined shape, as in the SHG element of the first embodiment.

According to the methods of manufacturing a wavelength converting element of the present invention, the optical waveguide can be formed in a given area in the LiNbO$_3$ thin film formed on the LiTaO$_3$ substrate and the thickness of the optical waveguide can evenly be set to approximately the thickness of the LiNbO$_3$ thin film, so that the optical waveguide whose thickness matches with the thickness of the LiNbO$_3$ thin film can be formed. It is therefore possible to control the thickness of the optical waveguide to the desired thickness. Since the mode of light that propagates in the thus-formed optical waveguide becomes a low-order mode, the efficiency of converting the second harmonic of incident light can be improved.

According to the wavelength converting element embodying the present invention, since the optical waveguide has a substantially uniform desired thickness, the mode of light that propagates in this optical waveguide becomes a low-order mode, thus ensuring an improved efficiency of converting the light incident to the wavelength converting element to the second harmonic of light.

What is claimed is:

1. A wavelength converting element comprising:

a substrate of lithium tantalate;

a thin film of lithium niobate formed on said substrate of lithium tantalate; and an optical waveguide comprising potassium niobate, formed on a portion of an upper face of said substrate by performing a proton exchange on an area of said thin film of lithium niobate and then performing a potassium ion exchange on said area to convert said lithium niobate to said potassium niobate, wherein the depth of the potassium niobate is substantially equal to the thickness of the unconverted lithium niobate thin film and a bottom end of said optical waveguide is positioned generally at a level of the upper face of said substrate of lithium tantalate, and wherein an upper face of said optical waveguide is exposed to air.

2. A wavelength converting element comprising:

a substrate of lithium tantalate;

a thin film of lithium niobate formed on said substrate of lithium tantalate; and an optical waveguide comprising potassium niobate, formed on a portion of an upper face of said substrate by performing a proton exchange on an area of said thin film of lithium niobate and then performing a potassium ion exchange on said area to convert said lithium niobate to said potassium niobate, wherein a bottom end of said optical waveguide is positioned generally at a level of the upper face of said substrate of lithium tantalate, and wherein an upper face of said optical waveguide is exposed to air; and wherein a remaining portion of said upper surface of said substrate, other than said portion on which said optical waveguide is formed, is covered by said thin film of lithium niobate, said proton exchange of said area of said thin layer of lithium niobate being performed using a mask layer positioned on said thin film of lithium niobate.

* * * * *